United States Patent Office 3,755,595
Patented Aug. 28, 1973

3,755,595
FUNGICIDAL METHODS AND COMPOSITIONS CONTAINING A TRICYCLOHEXYLTIN COMPOUND AND AN ALIPHATIC AMINE
Cleve A. I. Goring, Walnut Creek, and Ronald J. Sbragia, Concord, Calif., assignors to The Dow Chemical Company, Midland, Mich.
No Drawing. Filed Apr. 23, 1970, Ser. No. 31,372
Int. Cl. A01n 9/00
U.S. Cl. 424—288                  8 Claims

ABSTRACT OF THE DISCLOSURE

Fungicidal methods and compositions containing a tricyclohexyltin compound together with an aliphatic amine such as butylamine, ethylenediamine, diethylenetriamine or N-ethylethylenediamine. The addition of the amine provides methods and compositions having increased microbiocidal activity as well as reduced levels of phytotoxicity when applied to plant foliage.

BACKGROUND ON THE INVENTION

Various miticidal and antifungal agents give effective mite and fungus control when applied to the aboveground portions of higher plants. However, many of these agents also damage blossoms and young leaves with which they may come into contact and thus cannot be used to the best advantage in all instances. This is true, for example, in the case of the hydroxide and other derivatives of tricyclohexyltin.

It is, therefore, an object of this invention to provide methods and compositions based on said tin compounds which are not only highly effective in controlling mites and fungi, but also are substantially non-phytotoxic. It is another object of the present invention to provide improved and novel agronomical practices and compositions for the raising and protection of crops. A further object is to protect plant parts from the attacks of mites and fungal organisms such as *Venturia inaequalis* (apple scab fungus or apple scab) and *Podosphaera leucotricha* (powdery mildew) by the application of the said compositions to plant foliage.

SUMMARY OF THE INVENTION

It has been discovered that the foregoing and other objects of this invention can be attained by the provision and use on plant foliage of a fungicidal amount of a composition containing (1) at least one tricyclohexyltin compound of the group of tricyclohexyltin hydroxide, tricyclohexyltin chloride, tricyclohexyltin bromide and tricyclohexyltin acetate, in combination with (2) at least one aliphatic amine having a total of from 2 to about 12 carbon atoms, inclusive, in the molecule. The aliphatic amine compounds employed in the practice of the present invention are themselves fungicidally inert. However, for reasons which are not clearly understood, said amines have the ability to enhance the fungicidal activity of the aforesaid compounds of tin while decreasing their phytotoxic characteristics. Such compositions are highly effective in controlling mites, apple scab and powdery mildew which attack the above-ground portions of plants without at the same time damaging the plant. Thus, the new methods and compositions make possible improved growth of plants and increased harvests.

The term "aliphatic amine" as employed herein and in the claims, includes straight chain compounds having one or more primary or secondary amino groups such as alkylamines, alkylenediamines, alkyl substituted alkylenediamines, polyalkylenepolyamines and the lower alkanolamines and their amino alkyl substitution products, all having a total of from 2 to 12 carbon atoms in the molecule. Representative aliphatic amines include the 2 to 12 carbon alkylamines, ethylamine, n-butylamine, and n-decylamine; the alkylenediamines and alkyl substituted alkylenediamines,
ethylenediamine,
1-methylethylenediamine,
1,2-dimethylethylenediamine,
1,1-dimethylethylenediamine,
N-ethylethylenediamine,
N-methylethylenediamine,
N-butylethylenediamine,
N,N'-dimethylethylenediamine and
N,N-dimethylethylenediamine;

the polyalkylenepolyamines, diethylenetriamine, triethylenetetramine, tetraethylenepentamine, pentaethylenehexamine; and the loweralkanol- and aminoloweralkyl loweralkanolamines, diethanolamine and aminoethylethanolamine. These aliphatic amine additives are solid or liquid compounds ranging from those of low viscosity to those of a highly viscous character. Some are relatively soluble in water, while all are soluble to a certain extent in alcohols as well as in acetone and other organic solvents.

The term "tin compound(s)," as employed herein, includes tricyclohexyltin hydroxide, tricyclohexyltin acetate, tricyclohexyltin chloride, and tricyclohexyltin bromide. The tin compounds are crystalline solids which are somewhat soluble in many common solvents and, except for the water-soluble acetate, are of low solubility in water.

In formulating the compositions of this invention the aliphatic amine is employed in the proportion of at least about one mole per mole of tin compound, and preferably the amine compound is employed in molar excess with respect to the tin compounds. Particularly good results are obtained by using approximately equal parts by weight of the tin compound and the aliphatic amine, representing an appreciable excess of the latter compound. The use of the indicated minimal amount of the alkylamine component is critical to the practice of this invention. When substantially less than about one mole of aliphatic amine per mole of tin compound is used, the compositions lack the desired enhancement in fungicidal activity and relative freedom from phytotoxic attack. Higher proportions of aliphatic amine to tin compound in excess of about 5 to 1 may be used if desired but do not enhance activity appreciably more.

In carrying out the method of the present invention, fungal growth and mites on higher plants is controlled by employing together one or more of the tin compounds and one or more of the aliphatic amine compounds. However, the present method also embraces the employment of a liquid or dust composition containing said compounds in the desired proportions. In such usage, the compounds can be modified with one or more of a plurality of additaments or parasiticide or fungicide adjuvants, including solvents or other liquid carriers, surface active dispersing agents or finely divided inert solids. Such augmented compositions are adapted to be distributed upon the fungal organisms or on their habitats, on aboveground portions of higher plants. The augmented compositions are also adapted to be employed as concentrates and subsequently diluted with additional inert carrier to produce other compositions in the form of dusts, sprays, washes or drenches. In compositions where the adjuvant is a finely divided solid, a liquid additament, a surface active agent or the combination of a surface active agent and a finely divided solid and/or a liquid additament, the adjuvant cooperates with the active components so as to facilitate the invention and obtain an improved and outstanding result.

Subject to the lower limit as set forth above on the molar proportion of the respective tin and aliphatic compounds to be employed, the amount of compounds to be used in compositions for the treatment of plant parts is not critical and may vary within relatively wide limits providing a fungicidal and miticidal dosage of the effective toxic agent can readily be supplied to the plant surface. The concentration of the tin compound in liquid compositions employed to supply the desired dosage may be from about 0.0001 to 30 percent by weight. In dusts, the effective weight of the tin compound may be from about 0.01 to 20 percent by weight. In compositions to be employed as liquid or dust concentrates, the total weight of the tin compound and the aliphatic amine present can be from about 5 to 95 percent by weight.

Liquid compositions containing the desired amount of the effective agents can be prepared by dissolving or dispersing the tin compound and any other toxicant employed, along with the aliphatic amine component, in any appropriate solvent medium either with or without the addition of a surface active agent. Representative organic solvents for this purpose include acetone, xylene, toluene, isopropanol, polyglycols, chlorinated hydrocarbons such as methylene chloride, carbon tetrachloride and chlorobenzene, and petroleum distillates such as diesel fuel, kerosene, fuel oil, naphthas and Stoddard solvent. Among the petroleum distillates, those boiling almost entirely under 400° F. at atmospheric pressure and having a flash point about 80° F. are generally preferred. However, any suitable liquid carrier or combination of carriers can be employed. There also may be employed aqueous compositions including aqueous solutions as well as those, for example, which contain a small amount of a water-immiscible solvent whereby the carrier comprises an aqueous emulsion, namely, a mixture of water, a surface-active agent and solvent. In the liquid compositions, the choice of the surface-active emulsifying agent and the amount thereof to be employed are dictated by the nature of the composition and by the ability of the emulsifying agent to facilitate the dispersion of the toxic tin compound and the accompanying aliphatic amine in the carrier to produce the desired composition.

The term "surface-active agent" is employed herein to include all agents which are capable of acting on the interfacial surface between the tin and aliphatic amine compounds and the liquid dispersion medium, facilitating thereby the dispersion of said compounds in water and/or the organic liquid to form dispersible concentrate compositions or those which are to be applied to the plants. Representative surface-active dispersing agents useful for this purpose include bentonite, fuller's earth, attapulgite and other clays, condensation products of alkylene oxides with phenols and organic acids, alkyl aryl sulfonates, fatty acid esters of sugars and ethylene oxide derivatives thereof, polyoxyethylene derivatives of sorbitan esters, complex alcohols, mahogany soaps and the like. Other suitable surface-active dispersing agents are numerated in "Detergents and Emulsifiers Up to Date" written and published by John W. McCutcheon, Inc., Morristown, N.J., 1967. Any liquid concentrate can be diluted by the addition of water, organic solvents, additaments, non-phytotoxic adjuvants and the like to prepare the ultimate treating compositions.

In the preparation of dust compositions, the fungicidally active tin compound, together with the aliphatic amine component, is dispersed in and on a finely divided inert solid such as clay, talc, chalk, gypsum or the like. In such operations, the finely divided carrier is mechanically mixed or ground with the tin and the aliphatic amine compound. Similarly, dust compositions containing the said toxicant and amine compound may be prepared from various solid surface-active dispersing agents, such as bentonite, fuller's earth, attapulgite and other clays. Depending upon the proportions of ingredients, these dust compositions may be employed as such or may be used as concentrates and subsequently diluted with additional solid surface-active dispersing agents, or with chalk, talc, diatomaceous earth or gypsum or the like to obtain the desired amount of active ingredient in the composition adapted to be employed for dusting on the plant parts. Also, such dust compositions may be dispersed in water with or without the aid of a surface-active dispersing agent to form spray mixtures for application to plant parts.

When operating in accordance with the present invention, the composition is applied to the above-ground surfaces of plants by conventional procedures including spraying, dipping, dusting or the like. Further, the compositions can be applied at rates varying from a few pounds or gallons per acre to several hundred pounds or gallons per acre, depending on such factors as the concentration of the tin compound, the molar proportion of the aliphatic amine to the tin compound, the nature of the plant to be treated and the effect to be produced, so long as the plants are contacted with a cidal amount of the composition. In such operations the compositions of this invention are advantageously employed to control mite and fungal attack on such representative higher plants as almond, apple, apricot, banana, cherry, peach, pear, grape, carrot, tomato, cabbage, cucumber, cantaloupe, spinach, potato, beet, corn, hops, rice, wheat, beans, cotton, lettuce, onions, celery, tobacco and other crop plants, as well as conventional shrubs and flowering plants.

DESCRIPTION OF THE PREFERRED EMBODIMENTS

The following examples are illustrative of the invention but are not to be construed as limiting.

Example 1

(a) 50 parts by weight of tricyclohexyltin hydroxide are mixed and ground with 18 parts of diatomaceous earth (Celite 209), 28 parts of a hydrous aluminum silicate (Barden Clay,) 2 parts of a 9 mole ethylene oxide condensate of p-nonylphenol (Dowfax 9N9) and 27 parts of a substituted benzoic acid sulfonic acid (Daxad No. 27) to prepare an emulsifiable powder. 24 Parts of this powder are then mixed thoroughly with a solution of 12 parts of triethylenetetramine in 1000 parts of acetone to produce a liquid concentrate dispersion containing ca. 12,000 parts per million (p.p.m.) of the active (tin) compound and ca. 12,000 p.p.m. of the amine additive which can then be used in accordance with the foregoing teachings.

(b) In a similar procedure, a concentrate is prepared in the manner described in paragraph (a) above, but with water being substituted for the acetone.

(c) In operations similar to those described above in paragraphs (a) and (b), compositions which can be used in accordance with the teachings hereof are prepared by employing one of the following in place of the triethylenetetramine: ethylenediamine, aminoethylethanolamine, diethylenetriamine, tetraethylenepentamine, pentaethylenehexamine, n-butylamine, n-decylamine, 1,2-dimethylethylenediamine, N-ethylethylenediamine, 1,2-propanediamine and dodecylamine.

(d) Other compositions useful in the practice of this invention are prepared following the procedures of paragraphs (a) and (b) above, but using one of the following in place of the tricyclohexyltin hydroxide: tricyclohexyltin acetate, tricyclohexyltin chloride, tricyclohexyltin bromide.

Example 2

Following the procedure of Example 1(a), concentrate compositions are prepared containing 12,000 p.p.m. of tricyclohexyltin hydroxide and a like amount of one of each of the aliphatic amines recited below in Table I, in addition to the other components of the concentrate. Each composition so prepared is then dispersed in water so as to provide aqueous spray compositions containing 1200 p.p.m., 300 p.p.m., 75 p.p.m., and 19 p.p.m., respectively, of said tin compound and a like amount, in each instance, of a given aliphatic amine. The resulting compositions are then sprayed with an atomizing spray nozzle using air pressure at 20 p.s.i. on young apple seedlings. The applications are carried out so as to give thorough coverage of all surfaces of the plant leaves without appreciable runoff. Following the applications, the spray compositions are allowed to dry upon the leaf surfaces and the plants are then inoculated by spraying them with an aqueous suspension of viable spores of Podosphaera leucotricha. Control operations are conducted in the same manner, but using spray compositions containing either (1) only one of each of the aliphatic amines, or (2) the tricyclohexyltin hydroxide without amine additive. Further, untreated apple plants of the same maturity are similarly inoculated to serve as checks.

Immediately following the inoculation, all plants are maintained under greenhouse conditions for about 10 days, following which they are observed and graded to determine relative disease control and the presence of any phytotoxicity, as evidenced by epidermal collapse. The untreated check plants and those treated only with one or another of the aliphatic amines all evidence a heavy infestation of the disease and present no evidence of phytotoxicity. The results obtained with the other formulations are as follows:

TABLE I

| Active ingredients | disease control $LD_{90}$ (p.p.m.) | Minimum concentration at which phytotoxicity is observed (p.p.m.) |
|---|---|---|
| Tricyclohexyltinhydroxide | 75 | 75 |
| Tricyclohexyltinhydroxide plus aminoethylethanolamine | 75 | 300 |
| Tricyclohexyltinhydroxide plus diethylenetriamine | <19 | 300 |
| Tricyclohexyltinhydroxide plus triethylenetetramine | <75 / >19 | >1,200 |

Example 3

In other operations conducted in the same manner as those set forth in Example 2, but with a different culture of powdery mildew organism, the following results are obtained.

TABLE II

| Active ingredients | disease control $LD_{90}$ (p.p.m.) | Minimum concentration at which phytotoxicity is observed (p.p.m.) |
|---|---|---|
| Tricyclohexyltinhydroxide | 75 | 300 |
| Tricyclohexyltinhydroxide plus ethylamine | 75 | 1,200 |
| Tricyclohexyltinhydroxide plus butylamine | <75 / >19 | 1,200 |
| Tricyclohexyltinhydroxide plus octylamine | <75 / >19 | 300 |
| Tricyclohexyltinhydroxide plus decylamine | <75 / >19 | >1,200 |
| Tricyclohexyltinhydroxide plus dodecylamine | <75 / >19 | 300 |
| Tricyclohexyltinhydroxide plus ethylenediamine | <75 / >19 | |
| Tricyclohexyltinhydroxide plus 1,2-propanediamine | <19 | >1,200 |
| Tricyclohexyltinhydroxide plus 1,1-dimethylethylenediamine | 19 | 1,200 |
| | >75 / >19 | <1,200 |
| Tricyclohexyltinhydroxide plus 1,2-dimethylethylenediamine | 19 | >1,200 |
| Tricyclohexyltinhydroxide plus N-methylethylenediamine | 75 | 1,200 |
| Tricyclohexyltinhydroxide plus N-ethylethylenediamine | 19 | >1,200 |
| Tricyclohexyltinhydroxide plus N-butylethylenediamine | <19 | 1,200 |
| Tricyclohexyltin hydroxide plus N,N'-dimethylethylenediamine | >19 | <1,200 |

Example 4

Using the general method of Example 1(a), spray compositions are prepared wherein the molar ratio of triethylenetetramine to tricyclohexyltin hydroxide is variously 5:1, 2:1, 1:1 and 1:2. These compositions, along with suitable controls, are then evaluated for the control of apple scab and for phytotoxic characteristics using the method of Example 2. The results obtained, which show the advantage of using formulations containing at least one mole of the aliphatic amine compound per mole of the tin compound, are presented below in Table III. Concentrations given are for tricyclohexyltin hydroxide.

TABLE III

| Molar ratio of triethylenetetramine to tricyclohexyltin hydroxide | Disease control $LD_{90}$ (p.p.m.) | Minimum concentration at which phytotoxicity is observed (p.p.m.) |
|---|---|---|
| 0:1 | >1,200 | 300 |
| 1:2 | >1,200 | 1,200 |
| 1:1 | 300 | 1,200 |
| 2:1 | 300 | 1,200 |
| 5:1 | 300 | 1,200 |

The tin compounds employed in the practice of this invention can be prepared by conventional methods which are known to the skilled in the art. Thus, tricyclohexyltin chloride is prepared by reacting $SnCl_4$ with the Grignard reagent, cyclohexyl magnesium chloride. The chloride compound so formed can then be converted to the corresponding hydroxide by hydrolysis, or to the acetate by reaction with acetic acid. The bromide can be formed by reacting the hydroxide with hydrogen bromide.

The aliphatic amine additives can also be prepared by conventional methods. For example, butylamine, n-octylamine and the like are prepared by interaction of ammonia with alkyl halide, followed by treatment with alkali. Aminoethylethanolamine is prepared by adding ethylene oxide to excess ethylenediamine. Polyalkylenepolyamines are prepared by methods described in Beilstein $4^2$,695.

We claim:

1. A composition useful for applying to mites and fungi for their control which comprises a miticidally and fungicidally effective amount of tricyclohexyltin hydroxide in combination with an amine selected from the group consisting of ethylamine, butylamine, decylamine, ethylenediamine, 1,2 - propanediamine, 1,1 - dimethylethylenediamine, 1,2-dimethylethylenediamine, N-methylethylenediamine, N - ethylethylenediamine, N - butylethylenediamine, N,N'-dimethylethylenediamine, diethylenetriamine, triethylenetetramine and aminoethylethanolamine, said amine being present in an amount of at least one mole per mole of the tin compound.

2. The composition of claim 1 wherein the amine is triethylenetetramine.

3. The composition of claim 1 wherein the amine is aminoethylethanolamine.

4. The composition of claim 1 wherein the amine is diethylenetriamine.

5. A method useful for the control of mites and fungi which comprises applying to mites and fungi a miticidally and fungicidally effective amount of a composition comprising tricyclohexyltin hydroxide in combination with an amine selected from the group consisting of ethylamine, butylamine, decylamine, ethylenediamine, 1,2-propanediamine, 1,1-dimethyl, ethylenediamine, 1,2-dimethylethylenediamine, N-methylethylenediamine, N-ethylethylenediamine, N-butylethylenediamine, N,N'-dimethylethylenediamine, diethylenetriamine, triethylenetetramine, and aminoethylethanolamine, said amine being present in a proportion of at least one mole per mole of the tin compound.

6. The method of claim 1 wherein the amine is triethylenetetramine.

7. The method of claim 1 wherein the amine is aminoethylethanolamine.

8. The method of claim 1 wherein the amine is diethylenetriamine.

References Cited

UNITED STATES PATENTS

| | | | |
|---|---|---|---|
| 1,919,298 | 7/1933 | Lehmann et al. | 424—325 |
| 2,244,712 | 6/1941 | Kyrides | 424—325 |
| 2,693,491 | 11/1954 | Prichard et al. | 424—325 X |
| 3,264,177 | 8/1966 | Kenaga | 424—288 |
| 3,268,395 | 8/1966 | Taylor | 424—288 |
| 3,391,174 | 7/1968 | Wowk | 260—429.7 |
| 3,415,935 | 12/1968 | Friker | 424—288 X |
| 3,542,824 | 11/1970 | Bublitz | 424—288 X |
| 2,246,524 | 6/1941 | Kyrides | 424—325 X |
| 3,544,608 | 12/1970 | Pande | 424—288 X |

FOREIGN PATENTS

| | | | |
|---|---|---|---|
| 1,212,349 | 3/1966 | Germany | 424—325 |
| 1,521,398 | 3/1968 | France | 424—325 |

ALBERT T. MEYERS, Primary Examiner

V. D. TURNER, Assistant Examiner

U.S. Cl. X.R.

424—325

PO-1050
(5/69)

UNITED STATES PATENT OFFICE
CERTIFICATE OF CORRECTION

Patent No. 3,755,595      Dated August 28, 1973

Inventor(s) Cleve A. I. Goring and Ronald J. Sbragia

It is certified that error appears in the above-identified patent and that said Letters Patent are hereby corrected as shown below:

Column 5, line 59, delete ">" and substitute --<--.
Column 6, lines 72 and 74, delete "1" and substitute --5--.
Column 7, line 1, delete "1" and substitute --5--.

Signed and sealed this 12th day of March 1974.

(SEAL)
Attest:

EDWARD M. FLETCHER, JR.
Attesting Officer

C. MARSHALL DANN
Commissioner of Patents